(12) United States Patent
Uno

(10) Patent No.: US 11,679,629 B2
(45) Date of Patent: Jun. 20, 2023

(54) TIRE

(71) Applicant: SUMITOMO RUBBER INDUSTRIES, LTD., Hyogo (JP)

(72) Inventor: Hiroki Uno, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 23 days.

(21) Appl. No.: 17/555,647

(22) Filed: Dec. 20, 2021

(65) Prior Publication Data

US 2022/0203768 A1 Jun. 30, 2022

(30) Foreign Application Priority Data

Dec. 28, 2020 (JP) ............................. JP2020-218812

(51) Int. Cl.
*B60C 11/00* (2006.01)
*B60C 11/03* (2006.01)

(52) U.S. Cl.
CPC ........ *B60C 11/005* (2013.01); *B60C 11/0332* (2013.01); *B60C 2011/0025* (2013.01); *B60C 2011/0033* (2013.01); *B60C 2011/0344* (2013.01); *B60C 2011/0355* (2013.01)

(58) Field of Classification Search
CPC ............... B60C 11/0041; B60C 11/005; B60C 2011/0033
See application file for complete search history.

(56) References Cited

U.S. PATENT DOCUMENTS

2013/0213545 A1* 8/2013 Tanaka .................... B60C 13/02
152/454
2017/0297377 A1* 10/2017 Honda ................ B60C 11/0304

FOREIGN PATENT DOCUMENTS

| DE | 19731525 A1 | * | 7/1998 | .......... B60C 11/005 |
| DE | 19946446 A1 | * | 4/2001 | .......... B60C 1/0016 |
| JP | 08108710 A | * | 4/1996 | ......... B60C 11/0058 |
| JP | 2011121409 A | * | 6/2011 | |
| JP | 2018-2008 | | 1/2018 | |
| JP | 2018002008 A | * | 1/2018 | |

OTHER PUBLICATIONS

Machine Translation: DE-19731525-A1, Rodewald H, (Year: 2023).*
Machine Translation: JP-08108710-A, Kurokawa M, (Year: 2023).*
Machine Translation: JP-2018002008-A, Sueno J, (Year: 2023).*
Machine Translation: JP-2011121409-A, Iwasaki N, (Year: 2023).*
Machine Translation: DE-19946446-A1, Kuester S, (Year: 2023).*

* cited by examiner

*Primary Examiner* — Kendra Ly

(74) *Attorney, Agent, or Firm* — Greenblum & Bernstein, P.L.C.

(57) ABSTRACT

In a tire, a shape index of a reference ground contact surface is not less than 1.20 and not greater than 1.50. In the tire, a tread includes a cap layer, an intermediate layer formed such that a loss tangent of the intermediate layer at 30° C. is less than a loss tangent of the cap layer at 30° C. and a base layer formed such that a loss tangent of the base layer at 30° C. is less than the loss tangent of the intermediate layer at 30° C. In the radial direction, the intermediate layer is disposed outwardly of the base layer and the cap layer is disposed outwardly of the intermediate layer. In a shoulder land portion of the tread, a thickness of the cap layer at a center of an axial width is less than a thickness of the cap layer on the shoulder circumferential groove side.

19 Claims, 6 Drawing Sheets

TIRE

CROSS REFERENCE TO RELATED APPLICATION

The present application claims priority to Japanese patent application JP 2020-218812, filed on Dec. 28, 2020, the entire contents of which are incorporated herein by reference in its entirety.

BACKGROUND

Technical Field

The present disclosure relates to a tire.

Description of the Background Art

A tire having low rolling resistance is obtained by using rubber having a low-heat-generation property in a tread. A grip force of the rubber having a low-heat-generation property is lower as compared with rubber having a heat generation property that allows a high grip force to be exhibited. Therefore, in a case where rubber having a low-heat-generation property is used in a tread, for example, braking performance (hereinafter, also referred to as wet performance) on a wet road surface is degraded. It is difficult to obtain good balance between rolling resistance and wet performance. Various studies have been made in order to achieve reduction of rolling resistance and enhancement of wet performance (for example, see Japanese Laid-Open Patent Publication No. 2018-2008).

From the viewpoint of exhibiting a high grip force, a cap layer formed of rubber having a heat generation property is formed on an outer surface portion of a tread. The tread has circumferential grooves and has a plurality of land portions. As disclosed in Japanese Laid-Open Patent Publication No. 2018-2008, in general, each land portion is formed such that the cap layer has a substantially uniform thickness.

Depending on a ground contact shape of a tire, the land portion may not be uniformly worn as a whole, and a part of the land portion may be worn. Specifically, in a shoulder land portion formed on the outer side of the tread in the axial direction, among a portion corresponding to the end of the tread, a portion on the sidewall side is hardly worn, in some cases. In such a case, a part of the cap layer is left unworn in the shoulder land portion of the tire that has been worn due to running.

Rolling resistance of a tire is required to be further reduced in consideration of influence on the environment. The cap layer is formed of rubber having a heat generation property. Therefore, rolling resistance can be expected to be further reduced by replacing the cap layer which may be left unworn, with rubber that generates less heat than the cap layer.

The present disclosure has been made in view of such circumstances, and an object of the present disclosure is to provide a tire that can reduce rolling resistance while ensuring required wet performance.

SUMMARY

A tire according to one aspect of the present disclosure includes a tread configured to come into contact with a road surface. A ground contact surface obtained by mounting the tire on a normal rim, adjusting an internal pressure of the tire to 230 kPa, applying a load that is 70% of a normal load, to the tire, as a vertical load, and bringing the tire into contact with a planar road surface is a reference ground contact surface. A shape index represented by a ratio of an equator ground contact length measured along an equator of the tire, to a reference ground contact length at a position corresponding to a width that is 80% of a maximum ground contact width, on the reference ground contact surface, is not less than 1.20 and not greater than 1.50. At least three circumferential grooves are formed in the tread to form at least four land portions aligned in an axial direction. In the at least three circumferential grooves, a circumferential groove disposed on an outer side in the axial direction is a shoulder circumferential groove. A land portion disposed outwardly of the shoulder circumferential groove in the axial direction is a shoulder land portion, and a land portion disposed inwardly of the shoulder circumferential groove in the axial direction is a middle land portion. The tread includes a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C. The intermediate layer is disposed outwardly of the base layer in a radial direction, and the cap layer is disposed outwardly of the intermediate layer in the radial direction. In the shoulder land portion, a thickness of the cap layer at a center of an axial width is less than a thickness of the cap layer on the shoulder circumferential groove side.

DESCRIPTION OF THE PREFERRED EMBODIMENTS

Figure 1:
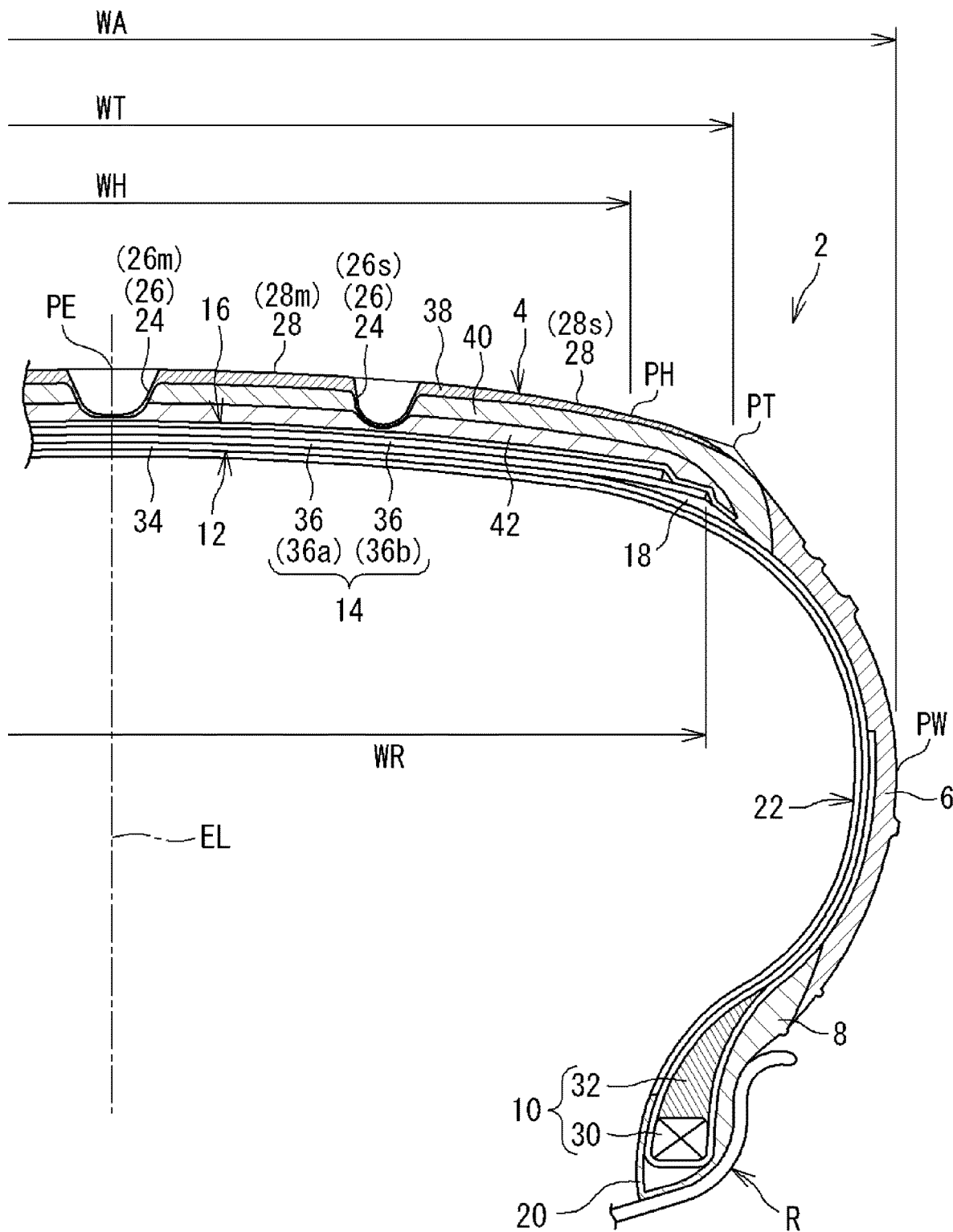
FIG. 1 is a cross-sectional view of a part of a tire according to one embodiment of the present disclosure.

The present disclosure will be described below in detail based on a preferred embodiment with appropriate reference to the drawings.

In the present disclosure, a state where a tire is mounted on a normal rim, an internal pressure of the tire is adjusted to a normal internal pressure, and no load is applied to the tire is referred to as a normal state. A state where a tire is mounted on a normal rim, an internal pressure of the tire is adjusted to 230 kPa, and no load is applied to the tire is referred to as a standard state.

In the present disclosure, unless otherwise specified, dimensions and angles of components of the tire are measured in the normal state. In a case where dimensions and angles of components on a meridian cross-section of a tire cannot be measured in a state where the tire is mounted on a normal rim, the dimensions and angles are measured by conforming a distance between left and right beads to a distance between beads of a tire mounted on a normal rim, on a cross-section of the tire which is obtained by cutting the tire along a plane including a rotation axis.

The normal rim represents a rim defined by a standard on which the tire is based. Examples of the normal rim include the "standard rim" in the JATMA standard, the "Design Rim" in the TRA standard, and the "Measuring Rim" in the ETRTO standard.

The normal internal pressure represents an internal pressure defined by a standard on which the tire is based. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard.

The normal load represents a load defined by a standard on which the tire is based. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

In the present disclosure, crosslinked rubber refers to a molded product, of a rubber composition, obtained by pressurizing and heating the rubber composition. The rubber composition is uncrosslinked rubber obtained by mixing base rubber and chemicals in a kneading machine such as a Banbury mixer. The crosslinked rubber is also referred to as vulcanized rubber and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, sulfur, and a vulcanization accelerator. Selection of the base rubber and the chemicals, contents of the selected chemicals, and the like are determined as appropriate according to the specifications of the component, such as a tread and sidewalls, to which the rubber composition is applied.

In the present disclosure, a loss tangent (also referred to as tan δ), at a temperature of 30° C., of a component formed of the crosslinked rubber among components of the tire is measured by using a viscoelasticity spectrometer ("VES" manufactured by Iwamoto Seisakusho) under the following conditions in accordance with the standard of JIS K6394.

Initial strain=10%
Dynamic strain=2%
Frequency=10 Hz
Deformation mode=tension

In this measurement, a test piece is sampled from the tire. In a case where a test piece cannot be sampled from the tire, a test piece is sampled from sheet-shaped crosslinked rubber (hereinafter, also referred to as rubber sheet) obtained by pressurizing and heating a rubber composition used for forming a component to be measured, at a temperature of 170° C., for 12 minutes.

FIG. 1 shows a part of a tire 2 according to one embodiment of the present disclosure. The tire 2 is for a passenger car. FIG. 1 shows a part of a cross-section (hereinafter, also referred to as a meridian cross-section) of the tire 2 taken along a plane including the rotation axis of the tire 2. In FIG. 1, the left-right direction represents an axial direction of the tire 2, and the up-down direction represents a radial direction of the tire 2. The direction perpendicular to the surface of the drawing sheet in FIG. 1 represents a circumferential direction of the tire 2.

In FIG. 1, an alternate long and short dash line EL represents an equator plane of the tire 2. The tire 2 has a shape that is symmetric about the equator plane except for a tread pattern and decorative portions such as patterns and characters formed at the outer surface.

In FIG. 1, the tire 2 is mounted on a rim R. The rim R is a normal rim. The inside of the tire 2 is inflated with air to adjust an internal pressure of the tire 2. The tire 2 mounted on the rim R is also referred to as a tire-rim complex. The tire-rim complex includes the rim R and the tire 2 mounted on the rim R.

In FIG. 1, a position represented by reference character PW is an outer end of the tire 2 in the axial direction. In a case where a decorative portion such as a pattern or a character is on the outer surface, the outer end PW is specified based on an imaginary outer surface obtained on the assumption that no decorative portion is provided.

In FIG. 1, a length represented by reference character WA is the maximal width, that is, a cross-sectional width (see JATMA or the like) of the tire 2. The cross-sectional width WA of the tire 2 represents a distance in the axial direction from one of the outer ends PW to the other of the outer ends PW. The outer end PW represents a position (hereinafter, referred to as maximal width position) at which the tire 2 has the maximal width. The cross-sectional width WA is measured in the tire 2 in the standard state.

The tire 2 includes a tread 4, a pair of sidewalls 6, a pair of clinches 8, a pair of beads 10, a carcass 12, a belt 14, a band 16, a pair of cushions 18, a pair of chafers 20, and an inner liner 22.

The tread 4 comes into contact with a road surface at the outer surface of the tread 4. The tread 4 has grooves 24. Thus, a tread pattern is formed.

In the tire 2, at least three circumferential grooves 26 extending continuously in the circumferential direction are formed in the tread 4. Thus, at least four land portions 28 aligned in the axial direction are formed in the tread 4. The tire 2 shown in FIG. 1 has the three circumferential grooves 26 formed in the tread 4, so that the four land portions 28 are formed. The circumferential grooves 26 form a part of the grooves 24 forming the tread pattern.

In FIG. 1, a position represented by reference character PE represents the equator of the tire 2. The equator PE is an intersection point of the outer surface of the tread 4 and the equator plane. As shown in FIG. 1, in a case where the groove 24 is formed at the equator plane, the equator PE is specified based on an imaginary outer surface of the tread 4 obtained on the assumption that the groove 24 is not provided.

Each sidewall 6 is continuous with the end of the tread 4. The sidewall 6 is disposed inwardly of the tread 4 in the radial direction. The sidewall 6 extends along the carcass 12 from the end of the tread 4 toward the clinch 8. The sidewall 6 is formed of crosslinked rubber produced in consideration of cut resistance.

Each clinch 8 is disposed inwardly of the sidewall 6 in the radial direction. The clinch 8 comes into contact with the rim R. The clinch 8 is formed of crosslinked rubber produced in consideration of wear resistance.

Each bead 10 is disposed inwardly of the clinch 8 in the axial direction. The bead 10 includes a core 30 and an apex 32. The core 30 includes a steel wire which is not shown.

The apex 32 is disposed outwardly of the core 30 in the radial direction The apex 32 is tapered outwardly. The apex 32 is formed of crosslinked rubber having a high stiffness.

The carcass 12 is disposed inwardly of the tread 4, the pair of sidewalls 6, and the pair of clinches 8. The carcass 12 extends on and between one of the beads 10 and the other of the beads 10. The carcass 12 has a radial structure.

The carcass 12 includes at least one carcass ply 34. The carcass 12 of the tire 2 is formed of one carcass ply 34 from the viewpoint of weight reduction.

The carcass ply 34 includes multiple carcass cords aligned with each other, which are not shown. The carcass cords are covered with topping rubber. Each of the carcass cords intersects the equator plane. The carcass cord is formed of an organic fiber. Examples of the organic fiber include nylon fibers, rayon fibers, polyester fibers, and aramid fibers.

The belt 14 is disposed inwardly of the tread 4 in the radial direction. The belt 14 is stacked on the carcass 12 from the outer side in the radial direction. In FIG. 1, a length represented by reference character WR is a width of the belt 14 in the axial direction. The axial width WR represents a distance in the axial direction from one end of the belt 14 to the other end of the belt 14. In the tire 2, the axial width WR of the belt 14 is not less than 65% of the cross-sectional width WA and not greater than 85% thereof.

The belt 14 includes at least two layers 36 stacked in the radial direction. In the tire 2, the belt 14 includes two layers 36 stacked in the radial direction. In the two layers 36, the layer 36 disposed on the inner side is an inner layer 36a, and the layer 36 disposed on the outer side is an outer layer 36b. As shown in FIG. 1, the inner layer 36a is wider than the outer layer 36b. A length from the end of the outer layer 36b to the end of the inner layer 36a is not less than 3 mm and not greater than 10 mm.

Each of the inner layer 36a and the outer layer 36b includes multiple belt cords aligned with each other, which are not shown. The belt cords are covered with topping rubber. Each of the belt cords is inclined relative to the equator plane. The material of the belt cords is steel.

The band 16 is disposed between the tread 4 and the belt 14 in the radial direction. The band 16 is stacked on the belt 14 in a portion inward of the tread 4.

The band 16 includes a helically wound band cord which is not shown. The band cord extends substantially in the circumferential direction. Specifically, an angle of the band cord relative to the circumferential direction is not greater than 5°. The band 16 has a jointless structure. In the tire 2, a cord formed of an organic fiber is used as the band cord. Examples of the organic fiber include nylon fibers, rayon fibers, polyester fibers, and aramid fibers.

In the tire 2, the band 16 is formed as a full band in which both ends oppose each other across the equator PE. The band 16 is wider than the belt 14. A length from the end of the belt 14 to the end of the band 16 is not less than 3 mm and not greater than 10 mm. The band 16 covers the entirety of the belt 14. The band 16 may include a pair of edge bands that are spaced from each other in the axial direction and cover the ends of the full band and the ends of the belt 14. The band 16 may be formed as the pair of edge bands only.

The cushions 18 are spaced from each other in the axial direction. Each cushion 18 is disposed between a ply body 34a of the carcass 12, and the end of the belt 14 and the end of the band 16. The cushion 18 is formed of crosslinked rubber having a low stiffness. In the tire 2, the cushion 18 may not necessarily be provided.

Each chafer 20 is disposed inwardly of the bead 10 in the radial direction. The chafer 20 comes into contact with the rim R. In the tire 2, the chafer 20 is formed of fabric and rubber impregnated in the fabric.

The inner liner 22 is disposed inwardly of the carcass 12. The inner liner 22 forms an inner surface of the tire 2. The inner liner 22 is formed of crosslinked rubber having a low gas permeation coefficient. The inner liner 22 retains an internal pressure of the tire 2.

In FIG. 1, a position represented by reference character PH is a position on the outer surface of the tread 4. The position PH corresponds to an axially outer end of a ground contact surface at which the tire 2 is in contact with a road surface.

The ground contact surface for specifying the position PH is obtained by using, for example, a ground contact surface shape measuring device (not shown). The ground contact surface is obtained by the device in a manner in which, in a state where a camber angle of the tire 2 in the standard state is 0°, a load that is 70% of the normal load is applied as a vertical load to the tire 2, and the tire 2 is brought into contact with a planar road surface. In the tire 2, the ground contact surface obtained in this manner is a reference ground contact surface, and a position, on the outer surface of the tread 4, corresponding to the axially outer end of the reference ground contact surface is the above-described position PH. In the tire 2, the position PH is a reference ground contact end.

Figure 2:
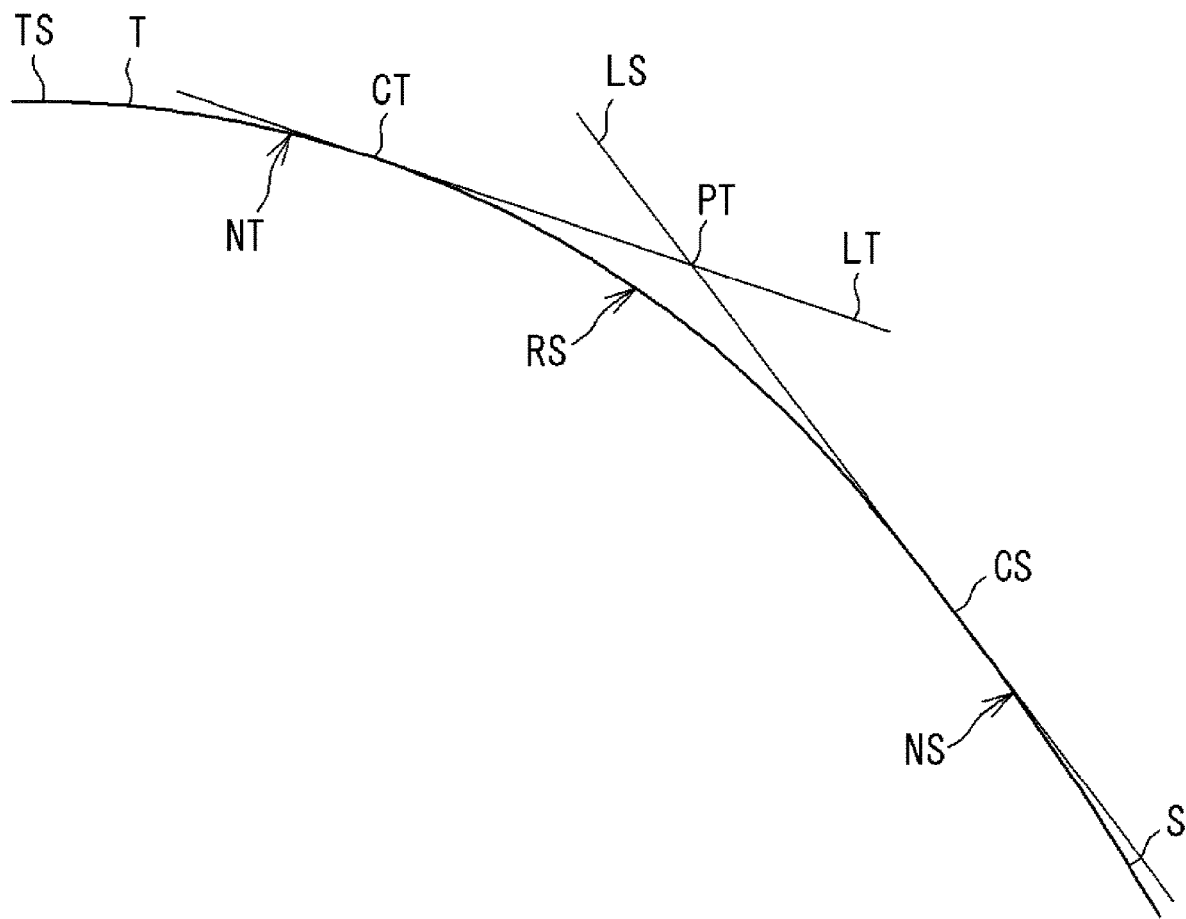
FIG. 2 is an enlarged cross-sectional view of a contour of a shoulder portion of the tire in FIG. 1.

FIG. 2 shows a part of the tire 2 in FIG. 1. In FIG. 2, the left-right direction represents the axial direction of the tire 2 and the up-down direction represents the radial direction of the tire 2. The direction perpendicular to the surface of the drawing sheet in FIG. 2 represents the circumferential direction of the tire 2.

FIG. 2 shows a contour of a shoulder portion of the tire 2 on the meridian cross-section. The contour shown in FIG. 2 is obtained by measuring the outer surface shape of the tire 2 in the standard state by a displacement sensor.

On the meridian cross-section, the contour of the outer surface (hereinafter, referred to as tire outer surface TS) of the tire 2 is formed by connecting a plurality of contour lines each formed as a straight line or an arc. In the present disclosure, the contour line formed as a straight line or an arc is simply referred to as a contour line. The contour line formed as the straight line is referred to as a straight contour line, and the contour line formed as an arc is referred to as a curved contour line.

The tire outer surface TS includes a tread surface T and a pair of side surfaces S continuous with the ends of the tread surface T. On the meridian cross-section, the contour of the tread surface T includes a plurality of curved contour lines having different radii. In the tire 2, in the plurality of curved contour lines included in the contour of the tread surface T, a curved contour line having the smallest radius is disposed at the end portion of the tread surface T and is connected to the side surface S. On the meridian cross-section, the contour of the tire outer surface TS includes, on each end portion of the tread surface T, a curved line portion that is a curved contour line connected to the side surface S and formed as an arc having the smallest radius among the plurality of curved contour lines included in the contour of the tread surface T. In FIG. 2, the curved line portion is represented by reference character RS.

On the contour of the tire outer surface TS, the curved line portion RS is in contact with a contour line (hereinafter, referred to as inner adjacent contour line NT) adjacent to the curve line portion RS on the inner side in the axial direction, at a contact point CT. The curved line portion RS is in contact with a contour line (hereinafter, referred to as outer adjacent contour line NS), forming a contour of the side surface S, adjacent to the curve line portion RS on the outer side in the axial direction, at a contact point CS. The contour of the tire outer surface TS includes the inner adjacent contour line NT that is disposed inwardly of the curved line portion RS in the axial direction and is in contact with the curved line portion RS, and the outer adjacent contour line NS that is disposed outwardly of the curved line portion RS in the axial direction and is in contact with the curved line portion RS.

In FIG. 2, a solid line LT is a line tangent to the curved line portion RS at the contact point CT at which the inner adjacent contour line NT and the curved line portion RS are in contact with each other. A solid line LS is a line tangent to the curved line portion RS at the contact point CS at which the outer adjacent contour line NS and the curved line portion RS are in contact with each other. A position represented by reference character PT is an intersection point of the tangent line LT and the tangent line LS. In the tire 2, the intersection point PT represents an imaginary tread end.

A portion of the tread 4 from one of the imaginary tread ends PT to the other of the imaginary tread ends PT is a region (hereinafter, also referred to as normal ground contact region) that is to come into contact with a road surface in a general running condition of the tire 2. From the viewpoint of effectively reinforcing the tread 4 portion (hereinafter, also referred to as tread portion), the belt 14 and the band 16 described above are disposed in the normal ground contact region.

In FIG. 1, a length represented by a double-headed arrow WT is a width of the tread 4. The width of the tread 4 represents a distance in the axial direction from one of the imaginary tread ends PT to the other of the imaginary tread ends PT. A length represented by a double-headed arrow WH is a width of the reference ground contact surface in the axial direction. The axial width WH represents a distance in the axial direction from one of the reference ground contact ends PH to the other of the reference ground contact ends PH.

In the tire 2, a ratio (WT/WA) of the width WT of the tread 4 to the cross-sectional width WA is not less than 70% and not greater than 90%. The imaginary tread end PT is disposed outwardly of the reference ground contact end PH in the axial direction. In other words, the axial width WH of the reference ground contact surface is less than the width WT of the tread 4. Specifically, a ratio (WH/WT) of the axial width WH to the width WT of the tread 4 is not less than 70% and not greater than 90%.

As described above, in the tire 2, the tread 4 has the three circumferential grooves 26. In the tire 2, arrangement of the three circumferential grooves 26, the groove depth, and the groove width are not particularly limited. As the arrangement of the circumferential grooves of the tire, the groove depth, and the groove width, typical arrangement, groove depth, and groove width are applied to the tread 4.

In the tire 2, in the three circumferential grooves 26, the circumferential grooves 26 disposed on the outer side in the axial direction are shoulder circumferential grooves 26s. The circumferential groove 26 disposed inwardly of the shoulder circumferential grooves 26s is a middle circumferential groove 26m.

As described above, in the tire 2, the tread 4 has the four land portions 28. In the four land portions 28, the land portions 28 disposed on the equator plane side are middle land portions 28m, and the land portions 28 disposed outwardly of the middle land portions 28m are shoulder land portions 28s.

The shoulder land portion 28s is the land portion 28 disposed outwardly of the shoulder circumferential groove 26s in the axial direction. The shoulder land portion 28s includes the reference ground contact end PH. The middle land portion 28m is the land portion 28 disposed inwardly of the shoulder circumferential groove 26s in the axial direction. The middle circumferential groove 26m is disposed between the left and right middle land portions 28m. In the tire 2, the middle circumferential groove 26m is disposed on the equator plane. The middle circumferential groove 26m is also referred to as a center circumferential groove.

Figure 3:
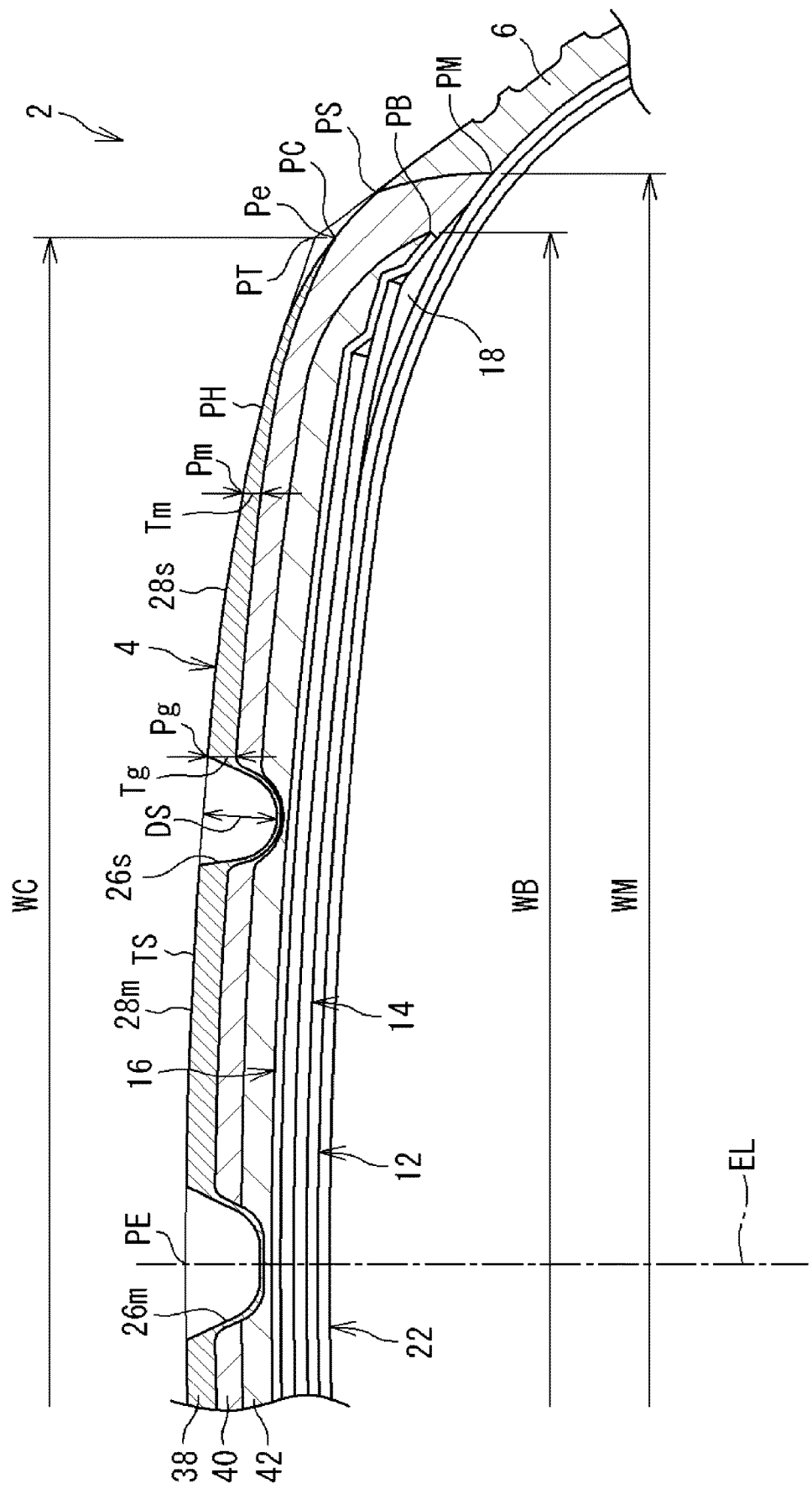
FIG. 3 is an enlarged cross-sectional view of a part of the tire in FIG. 1.

FIG. 3 shows a part of the tire 2 in FIG. 1. FIG. 3 shows the tread 4 portion of the tire 2. In FIG. 3, the left-right direction represents the axial direction of the tire 2 and the up-down direction represents the radial direction of the tire 2. The direction perpendicular to the surface of the drawing sheet in FIG. 3 represents the circumferential direction of the tire 2.

In the tire 2, the tread 4 includes a cap layer 38, an intermediate layer 40, and a base layer 42. In the radial direction, the intermediate layer 40 is disposed outwardly of the base layer 42, and the cap layer 38 is disposed outwardly of the intermediate layer 40. As shown in FIG. 3, the cap layer 38 is stacked on the intermediate layer 40 and the intermediate layer 40 is stacked on the base layer 42.

In FIG. 3, a position represented by reference character PC is the outer end of the cap layer 38. A length represented by reference character WC is an axial width of the cap layer 38. The axial width WC represents a distance in the axial direction from one of the outer ends PC to the other of the outer ends PC. A position represented by reference character PM is the outer end of the intermediate layer 40. A length represented by reference character WM is the axial width of the intermediate layer 40. The axial width WM represents a distance in the axial direction from one of the outer ends PM to the other of the outer ends PM. A position represented by reference character PB is the outer end of the base layer 42. A length represented by reference character WB is the axial width of the base layer 42. The axial width WB represents a distance in the axial direction from one of the outer ends PB to the other of the outer ends PB.

The outer end PC of the cap layer 38 is disposed inwardly of the outer end PM of the intermediate layer 40 in the axial direction. The outer end PC of the cap layer 38 is positioned at almost the same position as the outer end PB of the base layer 42 in the axial direction. In the tire 2, the position of the outer end PC of the cap layer 38 is adjusted as appropriate between the reference ground contact end PH and the outer end PM of the intermediate layer 40 in consideration of wet performance and rolling resistance.

The outer end PB of the base layer 42 is disposed inwardly of the outer end PM of the intermediate layer 40 in the axial direction. In the tire 2, a difference (WB-WT) between the axial width WB of the base layer 42 and the width WT of the tread 4 is not less than −10 mm and not greater than 10 mm. In other words, the axial width WB of the base layer 42 is almost equal to the width WT of the tread 4.

In FIG. 3, a position represented by reference character Pg is an edge of the shoulder land portion 28s on the shoulder circumferential groove 26s side. A distance in the axial direction from the edge Pg to the imaginary tread end PT is the axial width of the shoulder land portion 28s. A position represented by reference character Pm is a position on the outer surface of the tread 4 and is the center of the axial width of the shoulder land portion 28s. The center Pm is disposed inwardly of the reference ground contact end PH in the axial direction.

A length represented by reference character Tg is a cap layer thickness of the shoulder land portion 28s on the shoulder circumferential groove 26s side. The thickness Tg is measured along a straight line extending in the radial direction through the edge Pg of the shoulder land portion 28s on the shoulder circumferential groove 26s side. In a case where a shape of a boundary between the cap layer 38 and the intermediate layer 40 is changed according to the shape of the shoulder circumferential groove 26s, a thickness measured along a straight line extending in the radial direction through a position, on the outer surface of the tread 4, distant from the edge Pg toward the imaginary tread end PT by 1 mm is used as the thickness Tg.

A length represented by reference character Tm is a thickness of the cap layer 38 at the center Pm of the axial width of the shoulder land portion 28s. The thickness Tm is measured along a straight line extending in the radial direction through the center Pm of the axial width of the shoulder land portion 28s.

A position represented by reference character Pe is the intersection point of the outer surface of the tread 4 and a straight line extending through the imaginary tread end PT in the radial direction. The intersection point Pe is also referred to as a reference end of the tread 4. In a case where the outer end PC of the cap layer is disposed outwardly of the imaginary tread end PT in the axial direction, a thickness of the cap layer 38 measured along a straight line extending through the reference end Pe in the radial direction is represented as a thickness Te of the cap layer 38 at the reference end Pe of the tread 4.

In FIG. 3, a position represented by reference character PS is the outer end of the tread 4 on the tire outer surface TS. In the tire 2, the outer end PS of the tread 4 is disposed outwardly of the outer end PC of the cap layer 38 in the axial direction. A portion of the tire outer surface TS from the outer end PC to the outer end PS is formed by the intermediate layer 40. In the tire 2, a part of the intermediate layer 40 is exposed at the tire outer surface TS.

In FIG. 3, a length represented by reference character DS is a groove depth of the shoulder circumferential groove 26s. The groove depth DS is represented by the greatest groove depth of the shoulder circumferential groove. A projection such as a wear indicator is disposed on a groove bottom of the shoulder circumferential groove 26s, which is not shown. In the tire 2, a value obtained by subtracting 1.6 mm from the groove depth DS (unit is mm) is used as an effective groove depth DSe of the shoulder circumferential groove.

In the tire 2, the cap layer 38, the intermediate layer 40, and the base layer 42 are formed of crosslinked rubbers having different heat generation properties, respectively. In the tire 2, the cap layer 38 is most likely to generate heat and the base layer 42 is least likely to generate heat. The intermediate layer 40 has a heat generation property that is between the heat generation property of the cap layer 38 and the heat generation property of the base layer 42. In the tire 2, a loss tangent LTm of the intermediate layer 40 at 30° C. is less than a loss tangent LTc of the cap layer 38 at 30° C. A loss tangent LTb of the base layer 42 at 30° C. is less than the loss tangent LTm of the intermediate layer 40 at 30° C.

The loss tangent LTb of the base layer 42 at 30° C. is preferably not greater than 0.11. Thus, the base layer 42 effectively contributes to reduction of rolling resistance. From this viewpoint, the loss tangent LTb is more preferably not greater than 0.10 and even more preferably not greater than 0.09. The less the loss tangent LTb of the base layer 42 is, the better the effect is. Therefore, a preferable lower limit is not set.

The loss tangent LTm of the intermediate layer 40 at 30° C. is preferably not greater than 0.15. Thus, the intermediate layer 40 effectively contributes to reduction of rolling resistance. From this viewpoint, the loss tangent LTm is more preferably not greater than 0.14 and even more preferably not greater than 0.13. The loss tangent LTm of the intermediate layer 40 at 30° C. is preferably not less than 0.11. Thus, the intermediate layer 40 can assuredly have required stiffness and can effectively contribute to enhancement of wet performance. From this viewpoint, the loss tangent LTm is more preferably not less than 0.12.

The loss tangent LTc of the cap layer 38 at 30° C. is preferably not less than 0.15. Thus, the cap layer 38 can contribute to enhancement of wet performance. From this viewpoint, the loss tangent LTc is more preferably not less than 0.16 and even more preferably not less than 0.17. The cap layer 38 comes into contact with a road surface. From the viewpoint of enhancing wet performance, the greater the loss tangent LTc is, the better the effect is. However, in a case where the loss tangent LTc is great, heat generation is caused, and the cap layer 38 having generated heat may cause the temperature of the intermediate layer 40 to become higher than expected. From the viewpoint that the temperature of the entirety of the tread 4 is maintained stable and low rolling resistance can be maintained, the loss tangent LTc of the cap layer 38 at 30° C. is preferably not greater than 0.30, more preferably not greater than 0.28, and even more preferably not greater than 0.27.

Figure 4:
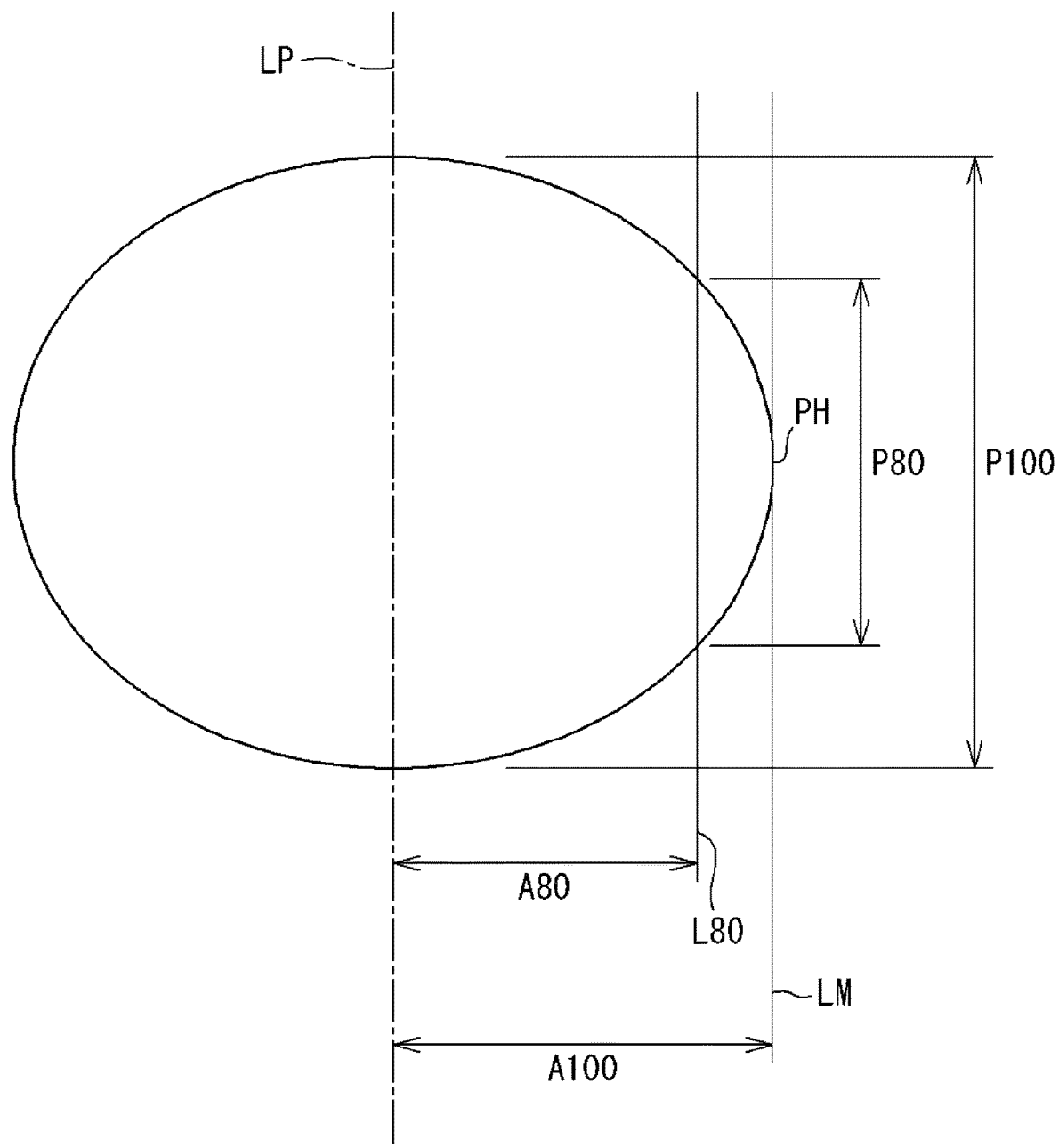
FIG. 4 shows an image for illustrating a method for calculating a shape index of a reference ground contact surface.

FIG. 4 shows a model of a contour shape of the reference ground contact surface. In FIG. 4, the up-down direction corresponds to the circumferential direction of the tire 2, and the left-right direction corresponds to the axial direction of the tire 2. The direction perpendicular to the surface of the drawing sheet in FIG. 4 corresponds to the radial direction of the tire 2.

In FIG. 4, an alternate long and short dash line LP represents a straight line corresponding to the equator PE of the tire 2 on the reference ground contact surface. On the reference ground contact surface, in a case where it is difficult to specify the equator PE, the center line of the reference ground contact surface in the axial direction is used as a straight line corresponding to the equator PE. A double-headed arrow P100 represents a length of a line of intersection of the reference ground contact surface and a plane including the straight line LP. In the tire 2, the length P100 of the line of intersection represents the equator ground contact length measured along the equator PE on the reference ground contact surface.

In FIG. 4, a solid line LM represents a straight line extending parallel to the straight line LP through the reference ground contact end PH of the reference ground contact surface. A solid line L80 represents a straight line that is disposed between the straight line LM and the straight line LP and parallel to the straight line LM and the straight line LP. A double-headed arrow A100 represents a distance in the axial direction from the straight line LP to the straight line LM. The distance A100 corresponds to half the maximal ground contact width of the reference ground contact surface. A double-headed arrow A80 represents a distance in the axial direction from the straight line LP to the straight line L80. In the tire 2, a ratio of the distance A80 to the distance A100 is set to be 80%. That is, the straight line L80 represents a position corresponding to a width that is 80% of the maximal ground contact width of the reference ground contact surface. A double-headed arrow P80 represents a length of a line of intersection of the reference ground contact surface and a plane including the straight line L80. In the tire 2, the length P80 of the line of intersection represents a reference ground contact length at a position corresponding to the width that is 80% of the maximum ground contact width at the reference ground contact surface.

In the tire 2, a ratio (P100/P80), of the equator ground contact length P100 to the reference ground contact length P80, which is specified on the reference ground contact surface and represented by using the equator ground contact length P100 and the reference ground contact length P80, is used as a shape index of a contour shape of the reference ground contact surface. The greater the value of the shape index is, the rounder the contour of the reference ground contact surface is.

As described above, the contour of the tread surface T is formed by connecting a plurality of contour lines each formed as a straight line or an arc. The shape index F of the reference ground contact surface is controlled by adjusting specifications (for example, the length of the straight contour line, and the radius and the length of the curved contour line) of the contour lines forming the contour of the tread surface T, which is not described in detail.

In the tire 2, the shape index of the reference ground contact surface is not less than 1.20 and not greater than 1.50. In the tire 2, the entirety of the shoulder land portion 28s is not uniformly worn, but a part thereof tends to be worn. In the tire 2, particularly a portion on the sidewall 6 side in the end portion of the tread 4 is hardly worn, and, therefore, even when the tire 2 is used and worn, the cap layer 38 may be left unworn at the outer side portion of the shoulder land portion 28s in the axial direction.

In the tire 2, the cap layer 38 in the middle land portion 28m has a substantially uniform thickness as a whole. Meanwhile, the cap layer 38 in the shoulder land portion 28s has a thickness equivalent to the thickness of the cap layer 38 in the middle land portion 28m on the shoulder circumferential groove 26s side, but the thickness of the cap layer 38 in the shoulder land portion 28s is gradually reduced outwardly from the shoulder circumferential groove 26s side in the axial direction. In the shoulder land portion 28s, the thickness Tm of the cap layer 38 at the center Pm of the axial width is less than a thickness Tg of the cap layer 38 on the shoulder circumferential groove 26s side.

In the tire 2, the cap layer 38 is prevented from being left unworn at the outer side portion of the shoulder land portion 28s in the axial direction. In other words, the cap layer 38 is formed so as to have a thickness required near the reference ground contact end PH of the shoulder land portion 28s. In the tire 2, a part of a portion in which the cap layer 38 is disposed in a conventional tire is replaced with the intermediate layer 40 that is less likely to generate heat than the cap layer 38. The tire 2 can reduce rolling resistance while ensuring required wet performance.

As described above, in the tire 2, the shape index of the reference ground contact surface is not less than 1.20 and not greater than 1.50. For example, the reference ground contact length P80 of the reference ground contact surface having a great shape index is shorter than the reference ground contact length P80 of the reference ground contact surface having a small shape index in a case where the equator ground contact length P100 is the same.

The greater the shape index is, the shorter the reference ground contact length P80 is. Therefore, in the tire 2, the greater the shape index is, the higher a ground contact pressure near the reference ground contact end PH of the reference ground contact surface is. The high ground contact pressure progresses wear. Therefore, in a case where the shape index of the reference ground contact surface is great, the tire 2 can assuredly exhibit good wet performance by increasing the thickness Tm of the cap layer 38 at the center Pm of the axial width of the shoulder land portion 28s. Meanwhile, in a case where the shape index of the reference ground contact surface is small, wear is unlikely to progress in the shoulder land portion 28s, and, therefore, rolling resistance can be further reduced in the tire 2 by reducing the thickness Tm of the cap layer 38.

In the tire 2, from the viewpoint of ensuring wet performance and reducing rolling resistance, a ratio (Tm/DSe) of the thickness Tm of the cap layer 38 at the center Pm of the axial width of the shoulder land portion 28s, to the effective groove depth DSe of the shoulder circumferential groove 26s is preferably not less than 15% and preferably not greater than 35%. Particularly, in the tire 2, from the viewpoint that the cap layer 38 having a required thickness at a required position can be effectively formed at the shoulder land portion 28s according to the shape index of the reference ground contact surface, when F represents the shape index and Rm (unit: %) represents the ratio (Tm/DSe), the ratio Rm more preferably satisfies the following expressions (1) and (2).

$$Rm \leq 33.333 \times F - 18 \quad (1)$$

$$Rm \geq 33.333 \times F - 22 \quad (2)$$

In the tire 2, from the viewpoint of ensuring wet performance and reducing rolling resistance, the ratio Rm more preferably satisfies the following expression (3).

$$Rm = 33.333 \times F - 20 \quad (3)$$

Figure 5:
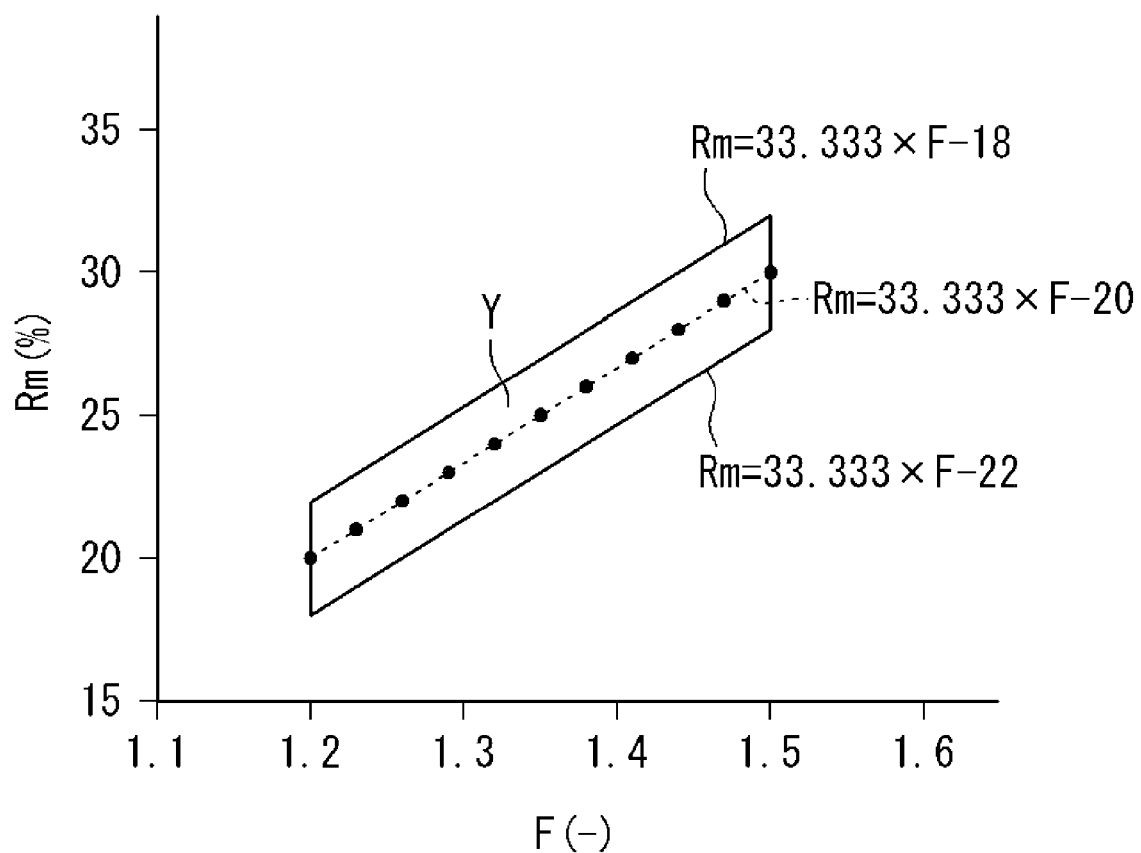
FIG. 5 illustrates a graph indicating a relationship between shape indexes and thickness ratios of cap layers, which are plotted against each other.

FIG. 5 shows a relationship between the shape index F and the ratio Rm (hereinafter, referred to as thickness ratio Rm of the cap layer 38) of the thickness Tm of the cap layer 38 at the center Pm of the axial width of the shoulder land portion 28s relative to the effective groove depth of the shoulder circumferential groove 26s when the shape index F and the ratio Rm are plotted against each other. In FIG. 2, the horizontal axis represents the shape index F, and the vertical axis represents the thickness ratio Rm of the cap layer.

In FIG. 5, a region represented by reference character Y is a region of the tires 2 satisfying the above-described expressions (1) and (2). In the tires 2 included in the region Y, in a case where the shape index F of the reference ground contact surface is great, the thickness Tm of the cap layer 38 at the center Pm of the axial width of the shoulder land portion 28 is great, whereas, in a case where the shape index F of the reference ground contact surface is small, the thickness Tm of the cap layer 38 is small. In the tire 2, the cap layer 38 having a required thickness at a required position can be effectively formed at the shoulder land portion 28s according to the shape index F of the reference ground contact surface. The tire 2 can allow good wet performance to be effectively ensured and allow rolling resistance to be further reduced.

In the tire 2, in the shoulder land portion 28s, a ratio (Tg/DSe) of the thickness Tg of the cap layer 38 on the shoulder circumferential groove 26s side to the effective groove depth DSe of the shoulder circumferential groove 26s is preferably not less than 40% and not greater than 60%.

The ratio (Tg/DSe) is set to be not less than 40%, whereby the cap layer 38 can contribute to ensuring good wet performance. From this viewpoint, the ratio (Tg/DSe) is more preferably not less than 45%.

The ratio (Tg/DSe) is set to be not greater than 60%, whereby influence of the cap layer 38 on rolling resistance is reduced. From this viewpoint, the ratio (Tg/DSe) is more preferably not greater than 55%.

As described above, the cap layer 38 in the middle land portion 28m has a substantially uniform thickness as a whole. In the tire 2, when the thickness of the cap layer at the center of the middle land portion 28m in the width direction is a thickness TM of the middle land portion 28m, a ratio (TM/DSe) of the thickness TM of the cap layer 38 in the middle land portion 28m to the effective groove depth DSe of the shoulder circumferential groove 26s is preferably not less than 40% and not greater than 60%, from the viewpoint of ensuring good wet performance and reducing rolling resistance.

The ratio (TM/DSe) is set to be not less than 40%, whereby the cap layer 38 can contribute to ensuring good wet performance. From this viewpoint, the ratio (Tg/DSe) is more preferably not less than 45%.

The ratio (TM/DSe) is set to be not greater than 60%, whereby influence of the cap layer 38 on rolling resistance is reduced. From this viewpoint, the ratio (Tg/DSe) is more preferably not greater than 55%.

In the tire 2, from the viewpoint that the cap layer 38 can effectively contribute to exhibition of wet performance, a ratio (WC/WA) of the axial width WC of the cap layer 38 to the cross-sectional width WA of the tire 2 is preferably not less than 70% and more preferably not less than 75%. From the viewpoint of effectively reducing influence of the cap layer 38 on rolling resistance, the ratio (WC/WA) is preferably not greater than 90% and more preferably not greater than 85%.

A high load acts on the tire 2 during braking. Thus, the ground contact width of the tire 2 tends to be increased. In the tire 2, the outer end PC of the cap layer 38 is disposed outwardly of the reference ground contact end PH in the axial direction. The cap layer 38 can come into sufficient contact with a road surface also during braking. In the tire 2, good wet performance can be obtained. From this viewpoint, the outer end PC of the cap layer 38 is preferably disposed outwardly of the reference ground contact end PH in the axial direction.

In the tire 2, from the viewpoint of reducing influence of the cap layer 38 on rolling resistance, the axial width WC of the cap layer 38 is preferably equal to or less than the axial width WM of the intermediate layer 40. From the viewpoint of further reducing rolling resistance, the cap layer 38 more preferably has a width less than that of the intermediate layer 40.

As described above, in the tire 2, the outer end PC of the cap layer 38 is disposed at substantially the same position as the position of the outer end PB of the base layer 42 in the axial direction. The outer end PM of the intermediate layer 40 is disposed outwardly of the outer end PC of the cap layer 38 in the axial direction. From the viewpoint that the intermediate layer 40 can effectively contribute to prevention of the base layer 42 from being exposed during limit run, a difference (WM-WC) between the axial width WM of the intermediate layer 40 and the axial width WC of the cap layer 38 is preferably not less than 10 mm. From the viewpoint of reducing rolling resistance, the difference (WM-WC) is preferably not greater than 30 mm, more preferably not greater than 20 mm, and even more preferably not greater than 10 mm. In the tire 2, from the viewpoint that rolling resistance can be effectively reduced while exposure of the base layer 42 is prevented, the difference (WM-WC) is particularly preferably 10 mm.

In the tire 2, preferably, a difference (WC-WT) between the axial width WC of the cap layer 38 and the width WT of the tread 4 is not less than −10 mm and not greater than 10 mm. In other words, the axial width WC of the cap layer 38 is preferably almost equal to the width WT of the tread 4. Thus, the cap layer 38 can come into sufficient contact with a road surface during not only straight running but also braking in which a high load acts. In the tire 2, good wet performance is obtained. From this viewpoint, the difference (WC-WT) is preferably not less than −5 mm and preferably not greater than 5 mm.

In the tire 2, a portion, of the tread 4, formed of the cap layer 38 and the intermediate layer 40 corresponds to a cap layer of a tread that is formed of the cap layer and a base layer in a conventional tire. From the viewpoint that the tread 4 can effectively contribute to enhancement of wet performance and reduction of rolling resistance, a ratio (LTc/LTm) of the loss tangent LTc of the cap layer 38 at 30° C. to the loss tangent LTm of the intermediate layer 40 at 30° C. is preferably not less than 110% and not greater than 250%. The ratio (LTc/LTm) is more preferably not less than 130% and even more preferably not less than 150%. The ratio (LTc/LTm) is more preferably not greater than 240% and even more preferably not greater than 230%.

As describe above, according to the present disclosure, the tire that can reduce rolling resistance while ensuring required wet performance can be obtained.

Examples

The present disclosure will be described below in more detail according to examples and the like. However, the present disclosure is not limited only to the examples.

Experiment 1

Example 1

A pneumatic tire (tire size=205/55R16), for a passenger car, having the basic structure shown in FIG. 1 and the specifications indicated below in Table 1 was obtained.

A tread including a cap layer, an intermediate layer, and a base layer, and having the structure shown in FIG. 3 was used. The loss tangent LTc of the cap layer at 30° C. was 0.27. The loss tangent LTm of the intermediate layer at 30° C. was 0.12. The loss tangent LTb of the base layer at 30° C. was 0.10.

A difference (WC-WT) between the axial width WC of the cap layer and the width WT of the tread was 0 mm. A difference (WB-WT) between the axial width WB of the base layer and the width WT of the tread was 0 mm. A difference (WM-WB) between the axial width WM of the intermediate layer and the axial width WB of the base layer was 10 mm.

In the shoulder land portion, a ratio Rg of the thickness Tg of the cap layer on the shoulder circumferential groove side to the effective groove depth DSe of the shoulder circumferential groove was 50%. A ratio Rm of the thickness Tm of the cap layer at the center of the axial width to the effective groove depth DSe of the shoulder circumferential groove was 30%. The axial width WC of the cap layer is equivalent to the width WT of the tread. A ratio Re of the thickness Te of the cap layer at the reference end Pe of the tread to the effective groove depth DSe of the shoulder circumferential groove was 0%.

Comparative Example 1

Figure 6:
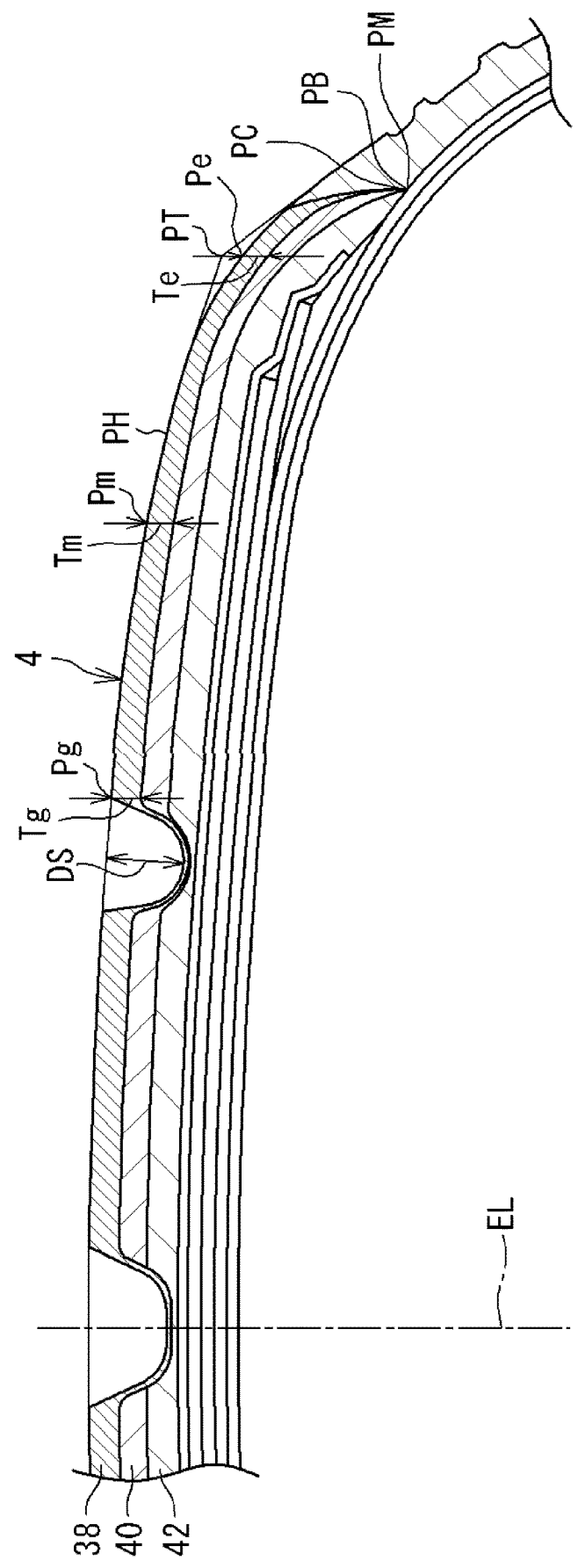
FIG. 6 is an enlarged cross-sectional view of a part of a tire of a comparative example 1.

A tire of comparative example 1 was obtained in the same manner as in example 1 except that the ratio Rm, the ratio Re, and the difference (WC-WT) were as indicated below in Table 1. FIG. 6 shows a structure of a tread of comparative example 1.

Example 2

A tire of example 2 was obtained in the same manner as in example 1 except that the ratio Re and the difference (WC-WT) were as indicated below in Table 1.

Example 3

A tire of example 3 was obtained in the same manner as in example 1 except that the ratio Rm was as indicated below in Table 1.

[Rolling Resistance Coefficient (RRC)]

A rolling resistance coefficient (RRC) was measured by using a rolling resistance testing machine when running with the test tire on a drum under the following conditions was performed at a speed of 80 km/h. The results are indicated below as indexes in Table 1 with the index of comparative example 1 being 100. The less the value is, the lower rolling resistance of the tire is.

Rim: 16×6.5 J
Internal pressure: 210 kPa
Vertical load: 4.82 kN

[Wet Performance (WET) of New Tire]

A new test tire was mounted on a rim (size=16×6.5 J) and was inflated with air to adjust an internal pressure of the tire to 230 kPa. The tire was mounted to a test vehicle (passenger car). The test vehicle was caused to run on a wet road surface (water film thickness=1.4 mm) in a test course. The test vehicle was braked in a state where the test vehicle was running at a speed of 100 km/h, and a running distance (braking distance) from a time when the vehicle was braked to a time when the vehicle stopped was measured. The results are indicated below as indexes in cells for "NEW" in Table 1 with the index of comparative example 1 being 100. The greater the value is, the less the braking distance is and the more excellent wet performance of the tire is. In this evaluation, an index of not less than 95 is required as an allowable index for ensuring required wet performance.

[Wet Performance (WET) of Worn Tire]

A new test tire was mounted on a rim (size=16×6.5 J) and was inflated with air to adjust an internal pressure of the tire to 230 kPa. The tire was mounted to a test vehicle (passenger car). The test vehicle was caused to run on a dry asphalt road surface in a test course to cause the tire to be worn. Wet performance of the worn tire was evaluated in the same manner as for wet performance of the new tire as described above at a point of time when the effective groove depth reached 50% of the effective groove depth of the new tire. The results are indicated below as indexes in cells for "OLD" in Table 1 with the index of comparative example 1 being 100. The greater the value is, the less the braking distance is and the more excellent wet performance of the tire is. In this evaluation, an index of not less than 95 is required as an allowable index for a tire maintaining good wet performance.

[Overall Evaluation]

An overall evaluation was made based on the indexes obtained for the evaluations. In the overall evaluation, for the rolling resistance coefficient, the less the value is, the better the evaluation is. Therefore, a value obtained by subtracting the index from 100 was obtained as an evaluation value. For the wet performance of new tires and worn tires, the greater the value is, the better the evaluation is. Therefore, a value obtained by subtracting 100 from the index was obtained as an evaluation value. The total of the evaluation values was calculated, and the overall evaluation was made based on the total value. The results are indicated below in cells for "Overall evaluation" in Table 1. The greater the value is, the better the evaluation is.

TABLE 1

|  |  | Comparative example 1 | Example 2 | Example 1 | Example 3 |
|---|---|---|---|---|---|
| F |  | 1.50 | 1.50 | 1.50 | 1.50 |
| Cap layer | Rg [%] | 50 | 50 | 50 | 50 |
|  | Rm [%] | 50 | 30 | 30 | 25 |
|  | Re [%] | 40 | 20 | 0 | 0 |
| WC-WT [mm] |  | 10 | 5 | 0 | 0 |
| RRC |  | 100 | 97 | 95 | 94 |
| WET | NEW | 100 | 100 | 100 | 100 |
|  | OLD | 100 | 100 | 100 | 95 |
| Overall evaluation |  | 0 | 3 | 5 | 1 |

Experiment 2

Examples 4 and 5 and Comparative Example 2

Tires of examples 4 and 5 and comparative example 2 were each obtained in the same manner as in example 1 except that the specifications of contour lines forming a contour of a tread surface were adjusted and the shape index F was set as indicated below in Table 2, and the ratio Rg, the ratio Rm, the ratio Re, and the difference (WC-WT) were set as indicted in Table 2.

[Rolling Resistance Coefficient (RRC)]

A rolling resistance coefficient (RRC) was measured in the same manner as in experiment 1. The results are indicated below as indexes in Table 2 with the index of comparative example 2 being 100. The less the value is, the lower rolling resistance of the tire is.

[Wet Performance (WET) of New Tire]

Wet performance of new tires was evaluated in the same manner as in experiment 1. The results are indicated below as indexes in cells for "NEW" in Table 2 with the index of comparative example 2 being 100. The greater the value is, the less the braking distance is and the more excellent wet performance of the tire is. In this evaluation, an index of not less than 95 is required as an allowable index for ensuring good wet performance.

[Wet Performance (WET) of Worn Tire]

Wet performance of worn tires was evaluated in the same manner as in experiment 1. The results are indicated below as indexes in cells for "OLD" in Table 2 with the index of comparative example 2 being 100. The greater the value is, the less the braking distance is and the more excellent wet performance of the tire is. In this evaluation, an index of not less than 95 is required as an allowable index for a tire maintaining good wet performance

[Overall Evaluation]

An overall evaluation was made based on the indexes obtained for the evaluations in the same manner as in experiment 1. The results are indicated below in cells for "Overall evaluation" in Table 2. The greater the value is, the better the evaluation is.

TABLE 2

|  |  | Comparative example 2 | Example 4 | Example 5 |
|---|---|---|---|---|
| F |  | 1.35 | 1.35 | 1.35 |
| Cap layer | Rg [%] | 50 | 50 | 50 |
|  | Rm [%] | 50 | 25 | 20 |
|  | Re [%] | 40 | 0 | 0 |
| WC-WT [mm] |  | 10 | 0 | 0 |
| RRC |  | 100 | 94 | 93 |
| WET | NEW | 100 | 100 | 100 |
|  | OLD | 100 | 100 | 95 |
| Overall evaluation |  | 0 | 6 | 2 |

Experiment 3

Examples 6 and 7 and Comparative Example 3

Tires of examples 6 and 7 and comparative example 3 were each obtained in the same manner as in example 1 except that the specifications of contour lines forming a contour of a tread surface were adjusted and the shape index F was set as indicated below in Table 3, and the ratio Rg, the ratio Rm, the ratio Re, and the difference (WC-WT) were set as indicated in Table 3. In example 7, the outer end of the cap layer was disposed inwardly of the imaginary tread end PT in the axial direction, and, therefore, the difference (WC-WT) is indicated as a negative value.

[Rolling Resistance Coefficient (RRC)]

A rolling resistance coefficient (RRC) was measured in the same manner as in experiment 1. The results are indicated below as indexes in Table 3 with the index of comparative example 3 being 100. The less the value is, the lower rolling resistance of the tire is.

[Wet Performance (WET) of New Tire]

Wet performance of new tires was evaluated in the same manner as in experiment 1. The results are indicated below as indexes in cells for "NEW" in Table 3 with the index of comparative example 3 being 100. The greater the value is, the less the braking distance is and the more excellent wet performance of the tire is. In this evaluation, an index of not less than 95 is required as an allowable index for ensuring good wet performance.

[Wet Performance (WET) of Worn Tire]

Wet performance of worn tires was evaluated in the same manner as in experiment 1. The results are indicated below as indexes in cells for "OLD" in Table 3 with the index of comparative example 3 being 100. The greater the value is, the less the braking distance is and the more excellent wet performance of the tire is. In this evaluation, an index of not less than 95 is required as an allowable index for a tire maintaining good wet performance.

[Overall Evaluation]

An overall evaluation was made based on the indexes obtained for the evaluations in the same manner as in experiment 1. The results are indicated below in cells for "Overall evaluation" in Table 3. The greater the value is, the better the evaluation is.

TABLE 3

|  |  | Comparative example 3 | Example 6 | Example 7 |
|---|---|---|---|---|
| F |  | 1.20 | 1.20 | 1.20 |
| Cap layer | Rg [%] | 50 | 50 | 50 |
|  | Rm [%] | 50 | 20 | 20 |
|  | Re [%] | 40 | 0 | 0 |
| WC-WT [mm] |  | 10 | 0 | −10 |
| RRC |  | 100 | 93 | 92 |
| WET | NEW | 100 | 100 | 98 |
|  | OLD | 100 | 100 | 95 |
| Overall evaluation |  | 0 | 7 | 1 |

As indicated in Tables 1 to 3, in the examples, it was confirmed that reduction of rolling resistance was achieved while required wet performance was ensured. The evaluation results clearly indicate that the technique in the present disclosure is superior.

The technique for achieving reduction of rolling resistance while required wet performance is ensured as described above is applicable to various tires.

Preferably, in the tire, F represents the shape index, and Rm (unit: %) represents a ratio of the thickness of the cap layer at the center of the axial width of the shoulder land portion relative to an effective groove depth of the shoulder circumferential groove, the ratio Rm satisfies the following expressions (1) and (2).

$$Rm \leq 33.333 \times F - 18 \qquad (1)$$

$$Rm \geq 33.333 \times F - 22 \qquad (2)$$

Preferably, in the tire, a ratio of the thickness of the cap layer on the shoulder circumferential groove side in the shoulder land portion relative to an effective groove depth of the shoulder circumferential groove is not less than 40% and not greater than 60%.

Preferably, in the tire, a ratio of a thickness of the cap layer in the middle land portion relative to an effective groove depth of the shoulder circumferential groove is not less than 40% and not greater than 60%.

Preferably, in the tire, an axial width of the cap layer is equal to or less than an axial width of the intermediate layer.

Preferably, in the tire, a difference between the axial width of the intermediate layer and the axial width of the cap layer is not less than 10 mm and not greater than 30 mm.

Preferably, in the tire, a difference between an axial width of the cap layer and a width of the tread is not less than −10 mm and not greater than 10 mm.

Preferably, in the tire, a ratio of the loss tangent of the cap layer at 30° C. to the loss tangent of the intermediate layer at 30° C. is not less than 110% and not greater than 250%.

According to the present disclosure, the tire that can reduce rolling resistance while ensuring required wet performance is obtained.

What is claimed is:

1. A tire comprising:
 a tread configured to come into contact with a road surface,
 wherein a ground contact surface obtained by mounting the tire on a normal rim, adjusting an internal pressure of the tire to 230 kPa, applying a load that is 70% of a normal load, to the tire, as a vertical load, and bringing the tire into contact with a planar road surface is a reference ground contact surface,
 wherein a shape index represented by a ratio of an equator ground contact length measured along an equator of the tire, to a reference ground contact length at a position corresponding to a width that is 80% of a maximum ground contact width, on the reference ground contact surface, is not less than 1.20 and not greater than 1.50, wherein at least three circumferential grooves are formed in the tread to form at least four land portions aligned in an axial direction, wherein, in the at least three circumferential grooves, a circumferential groove disposed on an outer side in the axial direction is a shoulder circumferential groove, wherein a land portion disposed outwardly of the shoulder circumferential groove in the axial direction is a shoulder land portion, and a land portion disposed inwardly of the shoulder circumferential groove in the axial direction is a middle land portion, wherein the tread comprises a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C., wherein the intermediate layer is disposed outwardly of the base layer in a radial direction, and the cap layer is disposed outwardly of the intermediate layer in the radial direction, wherein, in the shoulder land portion, a thickness of the cap layer at a center of an axial width is less than a thickness of the cap layer on the shoulder circumferential groove side, and wherein the cap layer in the middle land portion has a uniform thickness.

2. The tire according to claim 1, where F represents the shape index, and Rm (unit: %) represents a ratio of the thickness of the cap layer at the center of the axial width of the shoulder land portion relative to an effective groove depth of the shoulder circumferential groove, the ratio Rm satisfies the following expressions (1) and (2)

$$Rm \leq 33.333 \times F - 18 \qquad (1)$$

$$Rm \geq 33.333 \times F - 22 \qquad (2).$$

3. The tire according to claim 1, wherein a ratio of the thickness of the cap layer on the shoulder circumferential groove side in the shoulder land portion relative to an effective groove depth of the shoulder circumferential groove is not less than 40% and not greater than 60%.

4. The tire according to claim 1, wherein a ratio of a thickness of the cap layer in the middle land portion relative to an effective groove depth of the shoulder circumferential groove is not less than 40% and not greater than 60%.

5. The tire according to claim 1, wherein an axial width of the cap layer is equal to or less than an axial width of the intermediate layer.

6. The tire according to claim 5, wherein a difference between the axial width of the intermediate layer and the axial width of the cap layer is not less than 10 mm and not greater than 30 mm.

7. The tire according to claim 1, wherein a difference between an axial width of the cap layer and a width of the tread is not less than −10 mm and not greater than 10 mm.

8. The tire according to claim 1, wherein a ratio of the loss tangent of the cap layer at 30° C. to the loss tangent of the intermediate layer at 30° C. is not less than 110% and not greater than 250%.

9. The tire according to claim 1, wherein
the loss tangent of the base layer at 30° C. is not greater than 0.11,
the loss tangent of the intermediate layer at 30° C. is not greater than 0.15 and not less than 0.11, and
the loss tangent of the cap layer at 30° C. is not less than 0.15 and not greater than 0.30.

10. The tire according to claim 1, wherein the tire further comprises:
a pair of sidewalls, and each sidewall is continuous with the end of the tread and disposed inwardly of the tread in the radial direction,
a pair of clinches, and each clinch is disposed inwardly of the sidewall in the radial direction and each clinch comes into contact with a rim,
a pair of beads, and each bead is disposed inwardly of the clinch in the axial direction,
a carcass disposed inwardly of the tread, the pair of sidewalls, and the pair of clinches, in the radial direction,
a belt disposed inwardly of the tread in the radial direction and stacked on the carcass from the outer side, in the radial direction,
a band disposed between the tread and the belt in the radial direction, and stacked on the belt in a portion inward of the tread,
a pair of cushions spaced from each other in the axial direction and disposed between the carcass, the end of the belt, and the end of the band,
a pair of chafers, and each chafer is disposed inwardly of the bead in the radial direction, and
an inner liner disposed inwardly of the carcass in the radial direction and forms an inner surface of the tire.

11. The tire according to claim 1, wherein an effective groove depth of the shoulder circumferential groove is greater than a combined thickness of the cap layer and the intermediate layer.

12. The tire according to claim 11, wherein an effective groove depth of the shoulder circumferential groove is less than a combined thickness of the cap layer, the intermediate layer, and the base layer.

13. The tire according to claim 1, where F represents the shape index, and Rm (unit: %) represents a ratio of the thickness of the cap layer at the center of the axial width of the shoulder land portion relative to an effective groove depth of the shoulder circumferential groove, the ratio Rm satisfies the following expression (3)

$$Rm = 33.333 \times F - 20 \qquad (3).$$

14. A tire comprising:
a tread configured to come into contact with a road surface,
wherein a ground contact surface obtained by mounting the tire on a normal rim, adjusting an internal pressure of the tire to 230 kPa, applying a load that is 70% of a normal load, to the tire, as a vertical load, and bringing the tire into contact with a planar road surface is a reference ground contact surface,
wherein a shape index represented by a ratio of an equator ground contact length measured along an equator of the tire, to a reference ground contact length at a position corresponding to a width that is 80% of a maximum ground contact width, on the reference ground contact surface, is not less than 1.20 and not greater than 1.50,
wherein at least three circumferential grooves are formed in the tread to form at least four land portions aligned in an axial direction,
wherein, in the at least three circumferential grooves, a circumferential groove disposed on an outer side in the axial direction is a shoulder circumferential groove, wherein a land portion disposed outwardly of the shoulder circumferential groove in the axial direction is a shoulder land portion, and a land portion disposed inwardly of the shoulder circumferential groove in the axial direction is a middle land portion, wherein the tread comprises a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C., wherein the intermediate layer is disposed outwardly of the base layer in a radial direction, and the cap layer is disposed outwardly of the intermediate layer in the radial direction, wherein, in the shoulder land portion, a thickness of the cap layer at a center of an axial width is less than a thickness of the cap layer on the shoulder circumferential groove side, wherein a ratio of a thickness of the cap layer in the middle land portion relative to an effective groove depth of the shoulder circumferential groove is not less than 40% and not greater than 60%, where F represents the shape index, and Rm (unit: %) represents a ratio of the thickness of the cap layer at the center of the axial width of the shoulder land portion relative to an effective groove depth of the shoulder circumferential groove, the ratio Rm satisfies the following expressions (1) and (2)

$$Rm \leq 33.333 \times F - 18 \quad (1)$$

$$Rm \geq 33.333 \times F - 22 \quad (2), \text{ and}$$

wherein the cap layer in the middle land portion has a uniform thickness.

15. The tire according to claim 14, wherein
the loss tangent of the base layer at 30° C. is not greater than 0.11,
the loss tangent of the intermediate layer at 30° C. is not greater than 0.15 and not less than 0.11, and
the loss tangent of the cap layer at 30° C. is not less than 0.15 and not greater than 0.30.

16. The tire according to claim 14, wherein a ratio of the axial width of the cap layer to a cross-sectional width of the tire is not less than 70% and not greater than 90%.

17. The tire according to claim 14, wherein the cap layer in the shoulder land portion has a thickness equivalent to the thickness of the cap layer in the middle land portion on the shoulder circumferential groove side, and
wherein the thickness of the cap layer in the shoulder land portion is reduced outwardly from the shoulder circumferential groove side in the axial direction.

18. The tire according to claim 14, wherein a ratio of a thickness of the cap layer in the middle land portion relative to an effective groove depth of the shoulder circumferential groove is not less than 45% and not greater than 55%.

19. The tire according to claim 14, wherein a ratio of the thickness of the cap layer at a center of the axial width of the shoulder land portion relative to an effective groove depth of the shoulder circumferential groove is not less than 15% and not greater than 35%.

* * * * *